(12) United States Patent
Ikegame

(10) Patent No.: US 10,787,552 B2
(45) Date of Patent: Sep. 29, 2020

(54) METHOD FOR MANUFACTURING LIQUID EJECTION HEAD HAVING A WATER-REPELLENT LAYER AT THE EJECTION SURFACE

(71) Applicant: CANON KABUSHIKI KAISHA, Tokyo (JP)

(72) Inventor: Ken Ikegame, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 15/820,279

(22) Filed: Nov. 21, 2017

(65) Prior Publication Data

US 2018/0148556 A1 May 31, 2018

(30) Foreign Application Priority Data

Nov. 30, 2016 (JP) .................. 2016-233343

(51) Int. Cl.
*C08J 7/04* (2020.01)
*B41J 2/16* (2006.01)

(52) U.S. Cl.
CPC ............ *C08J 7/0427* (2020.01); *B41J 2/162* (2013.01); *B41J 2/1603* (2013.01); *B41J 2/164* (2013.01); *B41J 2/1631* (2013.01); *B41J 2/1639* (2013.01); *B41J 2/1645* (2013.01); *C08J 2379/08* (2013.01); *C08J 2483/04* (2013.01)

(58) Field of Classification Search
CPC .... C08J 7/047; C08J 2379/08; C08J 2483/04; B41J 2/1603; B41J 2/162; B41J 2/1631; B41J 2/1639; B41J 2/164; B41J 2/1645
See application file for complete search history.

(56) References Cited

U.S. PATENT DOCUMENTS

2014/0311661 A1* 10/2014 Tsutsui .................. B41J 2/1623
156/221

FOREIGN PATENT DOCUMENTS

JP       2011206628 A    10/2011

* cited by examiner

*Primary Examiner* — Robert S Walters, Jr.
(74) *Attorney, Agent, or Firm* — Canon U.S.A., Inc. IP Division

(57) ABSTRACT

A method for manufacturing a liquid ejection head includes forming a water-repellent layer containing a condensate of a first hydrolyzable silane compound and a second hydrolyzable silane compound, and irradiating the water-repellent layer with light including a light ray having a wavelength of less than 270 nm, wherein the first hydrolyzable silane compound contains a fluorine-containing group but no carbonyl group between the fluorine-containing group and a silicon atom, and the second hydrolyzable silane compound contains a fluorine-containing group and a carbonyl group between the fluorine-containing group and a silicon atom.

20 Claims, 3 Drawing Sheets

METHOD FOR MANUFACTURING LIQUID EJECTION HEAD HAVING A WATER-REPELLENT LAYER AT THE EJECTION SURFACE

BACKGROUND

Field of the Disclosure

The present disclosure relates to a method for manufacturing a liquid ejection head adapted to eject a liquid.

Description of the Related Art

Some of the liquid ejection heads include an ejection opening member on a substrate, and ejection openings are formed in the ejection opening member for ejecting ink. In this type of liquid ejection head, the properties of the surface of the ejection opening member defining the open ends of the ejection openings (this surface is hereinafter referred to as ejection opening surface) are key factors in terms of achieving good ejection performance. If liquid droplets are accumulated around the ejection openings, liquid may be ejected in a wrong direction or the speed of liquid ejection may be reduced. In order to eject liquid properly and accurately, a water-repellent layer may be formed at the ejection opening surface. For the case of ejecting a liquid containing a solvent and a coloring material as in the case of liquid ejection heads, a fluorine compound is suitable as the material of the water-repellent layer.

For forming the water-repellent layer containing a fluorine compound, the ejection opening member may be surface-treated with a fluorine-containing water-repellent material having a reactive functional group, such as alkoxysilane. In this instance, the reactive functional group reacts to bind the water-repellent material to the underlayer, and the fluorine component of the water-repellent material is segregated to the uppermost surface of the water-repellent layer. The water repellency of the water-repellent layer can be enhanced by introducing a long-chain fluorine-containing functional group to the water-repellent material for increasing the fluorine content in the water-repellent layer.

In the case of liquid ejection heads including a water-repellent layer containing a fluorine compound, when, for example, the ejection opening surface is wiped, the ejection opening surface may be locally charged to a positive potential due to the presence of the fluorine compound, thus having a nonuniform charge distribution. Consequently, some constituents in the ink can be attracted and adhere to the ejection opening surface. Particularly when a pigment ink is used as the liquid to be ejected, the ink is likely to adhere to the ejection opening surface. In some of the pigment inks, pigment fine particles are covered with a resin or the like so as to be stably dispersed or so as to enhance the fastness of the resulting printed articles. The uppermost surfaces of the pigment fine particles are charged by covering the surfaces of the pigment fine particles with a resin. The charged fine particles are repelled from each other, thereby stably dispersed. The uppermost surfaces of the pigment fine particles covered with a resin are often negatively charged. Such particles are likely to adhere to the ejection opening surface.

Japanese Patent Laid-Open No. 2011-206628 discloses a method for eliminating static electricity from the ejection opening surface by generating ions from a static elimination electrode opposing the ejection opening surface and applying the ions to the ejection opening surface by jetting air to the ejection opening surface.

SUMMARY

The present disclosure provides a method for manufacturing a liquid ejection head including a water-repellent layer to which ink is unlikely to adhere at the ejection opening surface, without using large-scale or expensive equipment.

According to an aspect of the present disclosure, there is provided a method for manufacturing a liquid ejection head having a water-repellent layer at an ejection surface having an ejection opening therein through which a liquid is ejected. The method includes forming a water-repellent layer containing a condensate of a first hydrolyzable silane compound and a second hydrolyzable silane compound, and irradiating the water-repellent layer with light including a light ray having a wavelength of less than 270 nm. The first hydrolyzable silane compound contains a fluorine-containing group but no carbonyl group between the fluorine-containing group and a silicon atom, and the second hydrolyzable silane compound contains a fluorine-containing group and a carbonyl group between the fluorine-containing group and a silicon atom.

Further features of the present disclosure will become apparent from the following description of exemplary embodiments with reference to the attached drawings.

DESCRIPTION OF THE EMBODIMENTS

According to a study by the present inventors, the static elimination disclosed in Japanese Patent Laid-Open No. 2011-206628 requires an apparatus for generating ions and an air flow generator for jetting the ions to the ejection openings and is an extensive process.

On the other hand, the method of the present disclosure enables the manufacture of a liquid ejection head that can prevent ink from adhering to the ejection opening surface, without using a large-scale or expensive equipment.

Figure 1:
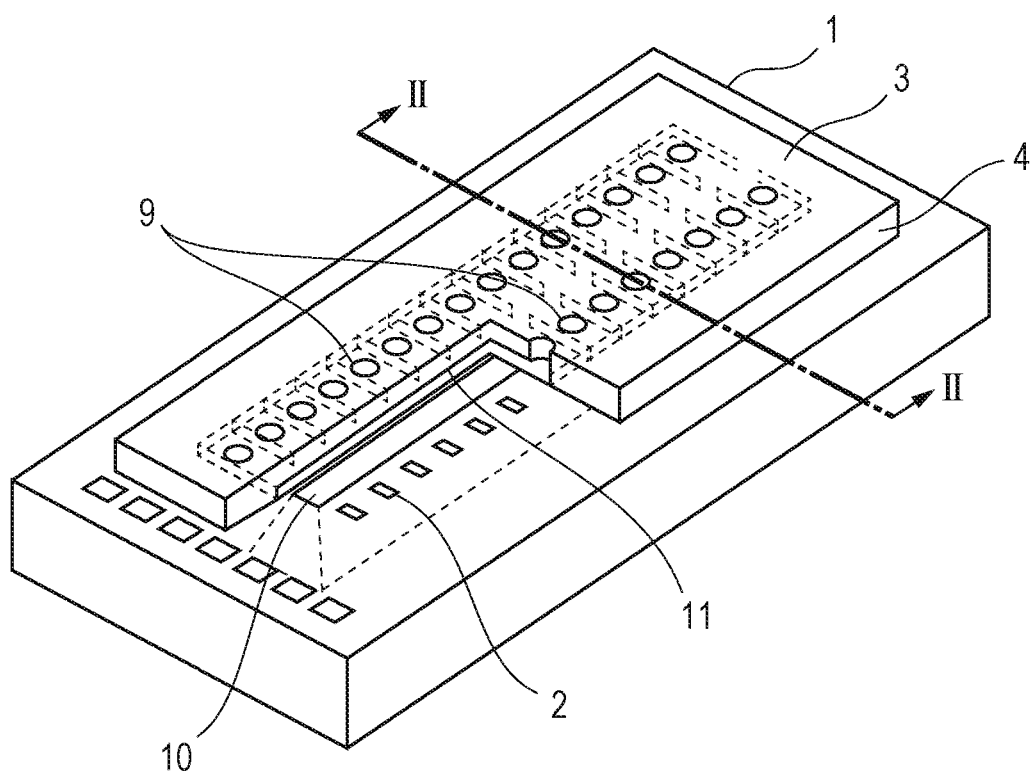
FIG. 1 is a schematic view of a liquid ejection head, according to one or more aspect of the current disclosure.

FIG. 1 shows a liquid ejection head manufactured by a method according to the present disclosure. The liquid ejection head shown in FIG. 1 includes a substrate 1 made of silicon or the like, and an ejection opening member 4 having ejection openings 9 therein on the substrate 1. The substrate 1 has a supply port 10 therein that passes from the front surface to the rear surface, and energy generating elements 2 are arranged at the front surface of the substrate 1. A liquid, such as an ink, is fed to the front side of the substrate 1 through the supply port 10, and is ejected through the ejection openings 9 by energy applied from the energy generating elements 2. The front surface of the ejection opening member 4, that is, the ejection opening surface 3, is provided with a water-repellent layer 5.

The water-repellent layer 5 is formed by applying a water-repellent material containing a condensate of a first hydrolyzable silane compound and a second hydrolyzable silane compound. The first hydrolyzable silane compound contains a fluorine-containing group but no carbonyl group between the fluorine-containing group and a silicon atom, and the second hydrolyzable silane compound contains a fluorine-containing group and a carbonyl group between the fluorine-containing group and a silicon atom.

The first hydrolyzable silane compound and the second hydrolyzable silane compound will now be described in detail.

The first hydrolyzable silane compound contains a fluorine-containing group but no carbonyl group between the fluorine-containing group and a silicon atom. The first hydrolyzable silane compound may be at least one selected from the hydrolyzable silane compounds represented by the following formulas (1) to (4):

(1)

(2)

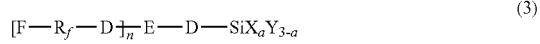
(3)

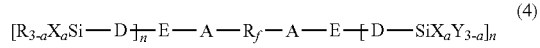
(4)

In formulas (1) to (4), $R_f$ represents a chemical group containing at least one selected from the group consisting of perfluoroalkylene groups, perfluoropolyether groups, and perfluorophenylene groups, D represents a single bond or an organic group having a carbon number of 1 to 12, A represents an organic group having a carbon number of 1 to 12, X represents a hydrolyzable substituent, and Y and R each represent a non-hydrolyzable substituent. Also, a represents an integer of 1 to 3. E represents a divalent or trivalent linking group having no carbonyl group, and n represents 1 when E represents a divalent linking group, or 2 when E represents a trivalent linking group. $R_f$, D, A, X, Y, R, E, n, and a each may be the same or different among the formulas (1) to (4).

The non-hydrolyzable groups represented by Y and R in formulas (1) to (4) include alkyl groups having a carbon number of 1 to 20 and the phenyl group. Y and R each may be the same or different among the formulas.

Examples of the linking group represented by E in formulas (1) to (4) include alkylene groups having a carbon number of 1 to 15, alkyleneoxy groups having a carbon number of 1 to 15, arylene groups having a carbon number of 1 to 15, and amide groups represented by —CONH— and —CON<.

Examples of the organic groups represented by A and E in formulas (1) to (4) include substituted or unsubstituted alkylene groups having a carbon number of 1 to 5, such as the methylene group, the ethylene group, and the propylene group.

Examples of the hydrolyzable substituent represented by X in formulas (1) to (4) include halogen atoms, alkoxy groups, an amino group, and a hydrogen atom. Beneficially, X represents an alkoxy group, such as methoxy, ethoxy, or propoxy. Alkoxy groups do not produce a radical that can inhibit cationic polymerization reaction when hydrolyzed, thus allowing easy reaction control. Examples of the non-hydrolyzable group represented by Y include alkyl groups having a carbon number of 1 to 20 and the phenyl group, and Y may be the same or different among the formulas.

The perfluoroalkylene group represented by $R_f$ in formulas (1) to (4) may be —$(CF_2)_s$—, wherein s represents an integer of 4 to 20, beneficially 5 to 10. The perfluoropolyether group represented by $R_f$ in formulas (1) to (4) has a structure in which at least one type of unit including a perfluoroalkylene group and an oxygen atom forms a string. For example, the perfluoropolyether group may be represented by the following formula (8):

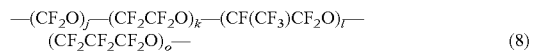
(8)

wherein j, k, l, and o each represent an integer of 0 or more, and at least one of j, k, l, and o is 2 or more.

In formula (8), each of the portions within parentheses is a unit, and j, k, l, and o are each the number of repetitions of the corresponding unit, that is, the number of the corresponding repeating units. The perfluoropolyether group is often a mixture of different repeating units having different numbers of repetitions in view of the characteristics thereof. The sum of the numbers of respective repeating units j, k, l, and o may be in the range of 3 to 30, beneficially 4 to 10, but depends on the structure of the perfluoropolyether group. If the sum of the numbers of repeating units is 3 or more, water repellency is further increased. If the sum of the numbers of repeating units is 30 or less, the first hydrolyzable silane compound exhibits good solubility in solvents. Accordingly, it is easy to subject to a condensation reaction with the other hydrolyzable silane compound and is also easy to apply to a surface. The larger the number of $CF_2$ groups in formula (8), the higher the water repellency. It is therefore beneficial that j+2k+3l+3o is 9 or more, such as 12 or more.

Beneficially, $R_f$ is a perfluoroalkylene group or a perfluoropolyether group. More beneficially, $R_f$ is a perfluoroalkylene group whose main chain has a carbon number of 5 or more.

Beneficially, the number average molecular weight of $R_f$ is in the range of 250 to 5000, such as in the range of 300 to 2000. When the number average molecular weight of $R_f$ is 250 or more, high water repellency can be achieved. Also, when the number average molecular weight of $R_f$ is 5000 or less, the first hydrolyzable silane compound can be sufficiently dissolved in a solvent and allows a desired condensation reaction. If $R_f$ is a perfluoropolyether group, the number average molecular weight thereof is the average total molecular weight of the portions represented by the respective repeating units in formula (8).

More specifically, examples of the first hydrolyzable silane compound include the compounds represented by the following formulas (9) to (17):

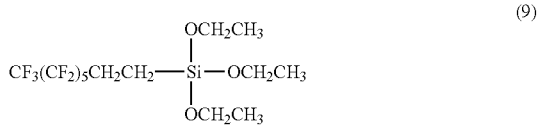
(9)

-continued

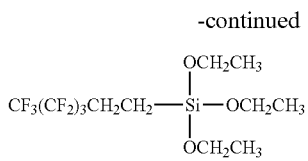
(10)

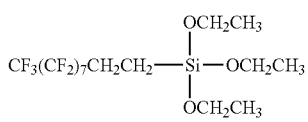
(11)

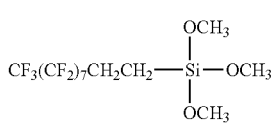
(12)

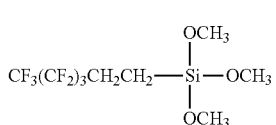
(13)

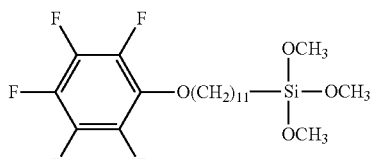
(14)

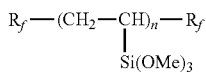
(15)

n = 2, 3
$R_f = [CF(CF_3)—O]_m—C_3F_7$  m = 1~8

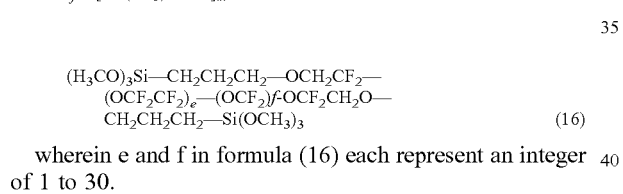
(16)

wherein e and f in formula (16) each represent an integer of 1 to 30.

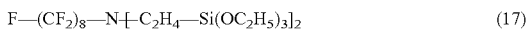
(17)

The second hydrolyzable silane compound contains a fluorine-containing group, and a carbonyl group between the fluorine-containing group and a silicon atom. The second hydrolyzable silane compound may be at least one selected from the hydrolyzable silane compounds represented by the following formulas (5) to (7):

F—$R_p$—D—Q—$[A—SiX_aY_{3-a}]_n$  (5)

$[R_{3-a}X_aSi—D]_n—Q—A—R_p—A—Q—[D—SiX_aY_{3-a}]_n$  (6)

F—$R_p$—D—Q$\left[\begin{array}{c}[A]_m—Z\\|\\SiX_aY_{3-a}\end{array}\right]_n$  (7)

In formulas (5) to (7), $R_p$ represents a chemical group containing at least one selected from the group consisting of perfluoroalkylene groups, perfluoropolyether groups, and perfluorophenylene groups, D represents a single bond or an organic group having a carbon number of 1 to 12, A represents an organic group having a carbon number of 1 to 12, X represents a hydrolyzable substituent, and Y and R each represent a non-hydrolyzable substituent. Z represents a hydrogen atom or an alkyl group. Q represents a divalent or trivalent linking group containing a carbonyl group, and n represents 1 when Q represents a divalent linking group, or 2 when Q represents a trivalent linking group. a represents an integer of 1 to 3, and m represents an integer of 1 to 4. $R_p$, D, A, X, Y, R, Z, Q, n, and a each may be the same or different among the formulas (5) to (7).

Examples of the non-hydrolyzable group represented by Y and R in formulas (5) to (7) include alkyl groups having a carbon number of 1 to 20 and the phenyl group. Y and R each may be the same or different among the formulas. Examples of the alkyl groups represented by Z include alkyl groups having a carbon number of 1 to 5, such as methyl, ethyl, and propyl. The linking group represented by Q may be a chemical group selected from the group consisting of a carbonyl group (—CO—), an ester group (—COO—), and amide groups represented by —CONH— or —CON<. Examples of the organic groups represented by A and D include substituted or unsubstituted alkylene groups having a carbon number of 1 to 5, such as the methylene group, the ethylene group, and the propylene group.

$R_p$ and X in formulas (5) to (7) are beneficially the same as those cited for the first hydrolyzable silane compound.

More specifically, examples of the second hydrolyzable silane compound include the compounds represented by the following formulas (18) to (22):

(18)

wherein s represents an integer of 1 to 30, and m represents an integer of 1 to 4;

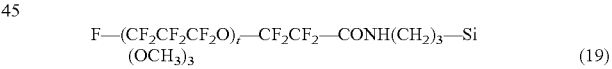
(19)

wherein t represents an integer in the range of 1 to 30;

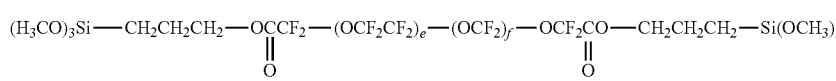
(20)

wherein e and f each represent an integer of 1 to 30;

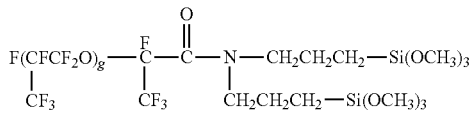
(21)

wherein g represents an integer of 1 to 30; and

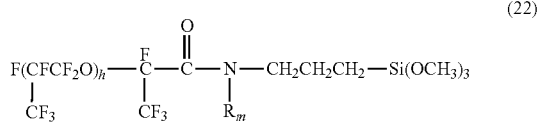

wherein $R_m$ represents a methyl group or a hydrogen atom, and h represents an integer of 1 to 30.

In formulas (18) to (22), the number of repeating units represented by each of s, t, e, f, g, and h may be in the range of 3 to 30 and is beneficially in the range of 4 to 10. When the number of repeating units is 3 or more, the compound tends to improve water repellency; when it is 30 or less, the solubility of the compound in a solvent tends to be high. If condensation reaction is conducted in a fluorine-free solvent, such as an alcohol, it is beneficial that the number of repeating units is in the range of 3 to 10.

Some silane compounds containing a perfluoropolyether group are commercially available, and examples thereof include KY-108 and KY-164 each produced by Shin-Etsu Chemical, EGC-2702 produced by Sumitomo 3M, and Fluorolink S10 produced by Solvay.

If the water-repellent layer containing a condensate of the first hydrolyzable silane compound and the second hydrolyzable silane compound is irradiated with light having a wavelength of less than 270 nm as will be described later, the second hydrolyzable silane compound is cleaved at the carbonyl group. It is assumed that this cleavage is accompanied by removal of the fluorine-containing group and formation of a hydroxy group. If the second hydrolyzable silane compound contains an amide group, the amine group can be formed. Consequently, the hydroxy group or the amino group charges the surface of the water-repellent layer to a negative potential. Many of the materials that can be contained in ink have a negative charge. In particular, the pigment fine particles in pigment inks are negatively charged at the surfaces by the resin added for helping the pigment fine particles disperse in water or a polar solvent. Accordingly, the negative charge at the surfaces of the pigment fine particles in the pigment ink repels the water-repellent layer negatively charged at the surface, thus preventing the pigment ink from adhering to the ejection opening surface. On the other hand, the first hydrolyzable silane compound in the water-repellent layer does not have such a carbonyl group. Therefore, the fluorine-containing group of the first hydrolyzable silane compound remains in the water-repellent layer even by irradiation with light having a wavelength of less than 270 nm and acts to maintain the water repellency of the water-repellent layer.

Thus, the liquid ejection head manufactured by the method described above has a water-repellent layer having a water repellency kept high and can prevent the ink, particularly pigment ink, from adhering to the ejection opening surface.

The condensate of the above-described hydrolyzable silane compounds is synthesized in a polar solvent containing an oxygen-containing component, such as the hydroxy group, the carbonyl group, or the ether bond. The condensation reaction is favored during heating. From the viewpoint of controlling the water content, the heating may be performed at 100° C. or less.

Examples of the polar solvent include alcohols, such as methanol, ethanol, propanol, isopropanol, and butanol; ketones, such as methyl ethyl ketone and methyl isobutyl ketone; esters, such as ethyl acetate and butyl acetate; ethers, such as diglyme and tetrahydrofuran; glycols, such as diethylene glycol; and other fluorine-free solvents. Since water is used for condensation, alcohols highly soluble in water are suitable. If the reaction is performed by heating reflux, a polar solvent having a boiling point in the range of 50° C. to 100° C. is suitable. Those polar solvents may be used singly or in combination.

For the condensation reaction, the amount by mole of the first hydrolyzable silane compound may be 1 time to 10 times that of the second hydrolyzable silane compound and is beneficially 1.5 times to 7 times. When the amount by mole of the first hydrolyzable silane compound is 1 time or more that of the second hydrolyzable silane compound, a high water repellency is achieved because the proportion of fluorine-containing groups that cannot be removed by the irradiation with light having a wavelength of less than 270 nm is high. When the amount by mole of the first hydrolyzable silane compound is 10 times or less that of the second hydrolyzable silane compound, the ink is prevented from adhering to the ejection opening surface effectively. The proportion by mole of the compounds can be appropriately adjusted according to the ink to be used and properties of the liquid ejection head.

In an embodiment of the present disclosure, a photocationic resin layer may underlie the water-repellent layer. In this instance, the water-repellent layer may contain an epoxy group from the viewpoint of enhancing the adhesion to the underlying ejection opening member. For adding an epoxy group, an additional hydrolyzable silane compound containing an epoxy group may be used together with the first and second hydrolyzable silane compounds to form a condensate as the water-repellent material. Beneficially, the hydrolyzable silane compound containing an epoxy group is represented by the following formula (23):

wherein $R_C$ represents an epoxy-containing non-hydrolyzable substituent, R represents a non-hydrolyzable substituent, X represents a hydrolyzable substituent, and b represents an integer of 1 to 3.

In formula (23), b is beneficially 2 or 3, more beneficially 3. $R_C$ may be a glycidoxypropyl group or an epoxycyclohexylethyl group. R may be an alkyl group having a carbon number of 1 to 20 or the phenyl group. X may represent a halogen atom, an alkoxy group, an amino group, or a halogen atom. Beneficially, X represents an alkoxy group, such as methoxy, ethoxy, or propoxy. Alkoxy groups do not produce a radical that can inhibit cationic polymerization reaction when hydrolyzed, thus allowing easy reaction control. Some of the portions represented by X may have been tuned into the hydroxy group by hydrolysis or formed into the siloxane bond by dehydration condensation.

Examples of the hydrolyzable silane compound represented by formula (23) include glycidoxypropylmethyltrimethoxysilane, glycidoxypropylmethyltriethoxysilane, epoxycyclohexylethyltrimethoxysilane, epoxycyclohexylethyltriethoxysilane, glycidoxypropylmethyldimethoxysilane, glycidoxypropylmethyldiethoxysilane, glycidoxypropyldimethylmethoxysilane, and glycidoxypropyldimethylethoxysilane. These compounds may be used singly or in combination.

The condensate used for forming the water-repellent layer may be synthesized by simultaneous condensation of the above-described hydrolyzable silane compounds and a further hydrolyzable silane compound containing an alkyl group or an aryl group. The hydrolyzable silane compound containing an alkyl group or an aryl group may be represented by the following formula (24):

$$(R_d)_a\text{—}SiX_{(4-a)} \quad (24)$$

wherein $R_d$ represents an alkyl group or an aryl group, X represents a hydrolyzable substituent, and a represents an integer of 1 to 3.

Examples of the group represented by $R_d$ in formula (24) include methyl, ethyl, propyl, butyl, hexyl, phenyl, and naphthyl. More specifically, examples of the hydrolyzable silane compound represented by formula (24) include methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, dimethyldimethoxysilane, dimethyldiethoxysilane, phenyltrimethoxysilane, phenyltriethoxysilane, trimethylmethoxysilane, and trimethylethoxysilane. These hydrolyzable silane compounds may be used singly or in combination.

Combined use of the hydrolyzable silane compound represented by formula (24) enables the control of the polarity and the crosslink density of the condensate. Combined use of such a noncationic polymerizable silane compound improves the freedom of fluorine-containing groups and substituents such as epoxy group to facilitate the orientation of the fluorine-containing groups to the interface with air and the polymerization of the epoxy group and to promote the condensation of silanol groups that have not reacted. Also, the presence of a nonpolar group, such as an alkyl group, suppresses the cleavage of siloxane bond to increase water repellency and durability.

The underlying ejection opening member may be made of a resin film or a photosensitive resin mainly containing a photopolymerizable resin having a multifunctional photocationic polymerizable group.

For forming an ejection opening member of a resin film, polyimide is beneficial from the viewpoint of resistance to ink or the like. Exemplary polyimide films include UPILEX series manufactured by Ube Industries and Kapton series produced by DuPont.

For an ejection opening member defined by a photosensitive resin layer, a negative photosensitive resin film is beneficial. Beneficially, the photosensitive resin has an epoxy group as the photopolymerizable group. Such an epoxy resin may be bisphenol A epoxy resin, bisphenol E epoxy resin, or novolak epoxy resin. The epoxy resin is commercially available, and examples thereof include Celloxide 2021, GT-300 series, GT-400 series, and EHPE 3150 (each produced by Daicel); 157S70 and 157S65 (each produced by Mitsubishi Chemical Corporation); EPICLON N-695 and EPICLON N-865 (each produced by DIC Corporation); SU-8 (produced by Nippon Kayaku); VG 3101 and EPOX-MKR 1710 (each produced by Printec); and Denacol series (produced by Nagase Chemtex). These resins may be used singly or in combination. The epoxy equivalent weight of the photopolymerizable resin may be 2000 or less and is beneficially 1000 or less. Photopolymerizable resin having an epoxy equivalent weight of 2000 or less provides a sufficient crosslink density when cured, and the cured product exhibits high adhesion without decreasing in glass transition temperature. Beneficially, the epoxy equivalent weight of the photopolymerizable resin is 50 or more. The epoxy equivalent weight used herein is the value measured in accordance with JIS K-7236. High-fluidity resin may degrade resolution. Accordingly, it is beneficial that photopolymerizable resin is solid at 35° C. or less. Commercially available negative photoresist may be used as the material of the ejection opening member, and examples thereof include SU-8 series and KMPR-1000 (each produced by Kayaku MicroChem); and TMMR S2000 and TMMF S2000 (each produced by Tokyo Ohka Kogyo). The photopolymerizable resin of the underlying ejection opening member may be a composite or mixture of a plurality of resins.

A method for manufacturing the liquid ejecting head according to an embodiment of the present disclosure will now be described with reference to FIGS. 2A to 2H. FIGS. 2A to 2H are sectional views of the liquid ejection head shown in FIG. 1, taken along line II-II and illustrate a manufacturing process of the liquid ejection head.

Figure 2A:
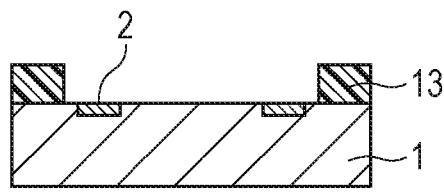
FIGS. 2A to 2H are schematic diagrams illustrating a method for manufacturing a liquid ejection head, according to one or more aspect of the current disclosure.

First, a substrate 1 provided with energy generating elements 2 at the front surface thereof is prepared as shown in FIG. 2A. The substrate 1 may be a monocrystalline silicon substrate, and each energy generating element 2 may be a heat resistor or a piezoelectric element. A resin layer 13 defining a liquid chamber (ink flow channel) is disposed on the substrate 1. The resin layer 13 will act as the side wall of the liquid chamber. For example, the material (photosensitive resin) of the resin layer is applied onto the substrate and patterned into the resin layer 13 by photolithography.

Figure 2E:
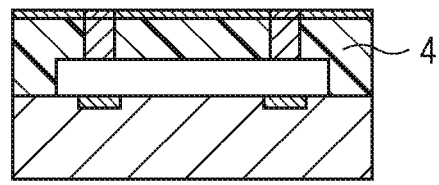
Figure 2B:
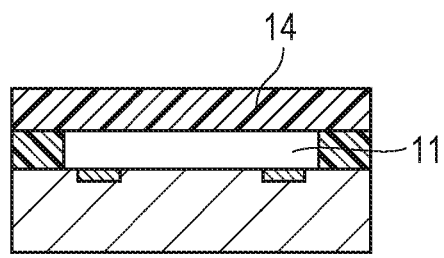

Then, another resin layer 14 is formed on the foregoing resin layer 13, as shown in FIG. 2B. The resin layer 14 is intended for use as the ejection opening member. The region surrounded by the substrate 1, the resin layers 13 and 14 is a liquid chamber 11. Beneficially, the resin layer 14 is formed of a photosensitive resin or the like as with the resin layer 13. Although the two resin layers 13 and 14 are formed in the present embodiment, these layers may be formed as a single layer.

Figure 2F:
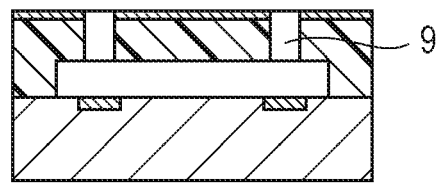
Figure 2C:
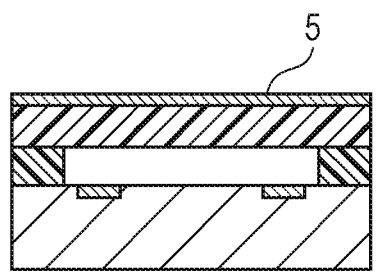

Subsequently, a water-repellent layer 5 is formed over the surface of the resin layer 14, as shown in FIG. 2C. In the present embodiment, the water-repellent layer 5 contains a condensate of the above-described hydrolyzable silane compounds and is formed by a method such as spin coating or slit coating. The thickness of the water-repellent layer 5 may be in the range of 50 nm to 10000 nm and is beneficially in the range of 80 nm to 5000 nm. A water-repellent layer having a thickness of 50 nm or more is likely to have a uniform water repellency and is highly durable. However, an excessively large thickness increases the water-repellent region in the ejection openings, thus causing unstable ejection. It is therefore beneficial that the thickness of the water-repellent layer is 10000 nm or less. Thus, a resin layer provided with the water-repellent layer 5 at the front surface acting as the ejection opening surface 3 is prepared.

Figure 2G:
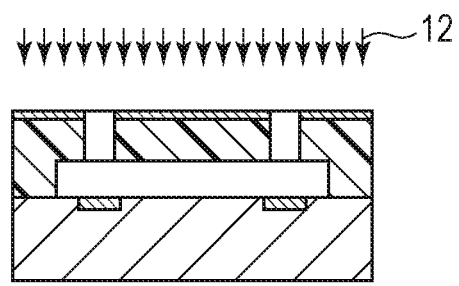
Figure 2D:
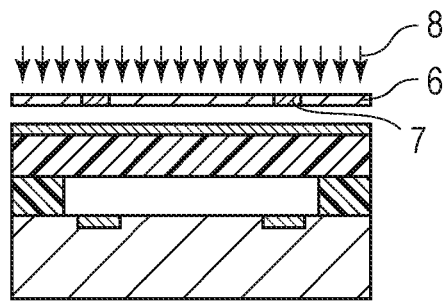
Figure 2H:
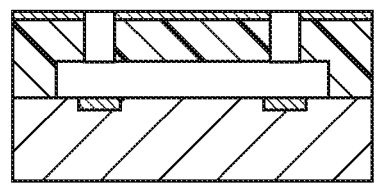

Then, the resin layer 14 and the water-repellent layer 5 are subjected to exposure, as shown in FIG. 2D. In the present embodiment, the resin layer 14 is made of a negative photosensitive resin that is sensitive to i-line. An i-line stepper or the like is used as the exposure device. The water-repellent layer 5 of the present embodiment contains a condensate of the first and the second hydrolyzable silane compounds and, in addition, another hydrolyzable silane compound containing an epoxy group. For exposure, the resin layer 14 and the water-repellent layer 5 are irradiated with light 8 through a mask 6 having light-blocking portions 7. The resin layer 14 and the water-repellent layer 5 are sensitive to light and allow a latent image pattern of the ejection openings to be formed therein, as shown in FIG. 2E.

Subsequently, the substrate with the resin layer and the water-repellent layer is heat-treated to promote a reaction at the exposed portions, as shown in FIG. 2E. This step enhances resistance to a subsequent development step. At this time, ether bonds are formed between the resin layer 14 and the water-repellent layer 5 by a reaction of the epoxy group. Also, a hydrolysis reaction proceeds between the hydroxy groups at the surface of the resin layer 14 and the silanol groups derived from the water-repellent layer 5. Consequently, strong bonds are formed between the resin layer 14 and the water-repellent layer 5, so that the water-repellent layer 5 becomes unlikely to separate from the resin layer 14. In addition, the heat treatment facilitates the orientation of the fluorine-containing groups in the water-repellent layer to the ejection opening surface. Although the water-repellent layer 5 and the resin layer 14 are illustrated in the figures as if they were distinct from each other, the water-repellent layer 5 may extend into the resin layer 14. Their boundary is not necessarily distinct. It suffices that the water-repellent layer 5 lies at the front surface of the resin layer.

Next, as shown in FIG. 2F, the water-repellent layer 5 and the resin layer 14 are developed with a developer to form ejection openings 9 in the resin layer 14 (and the water-repellent layer 5). Thus, the resin layer 14 is formed into the ejection opening member 4 that has the ejection openings 9 therein and that is provided with the water-repellent layer 5 at the ejection opening surface defining the open ends of the ejection openings 9.

Figure 3:
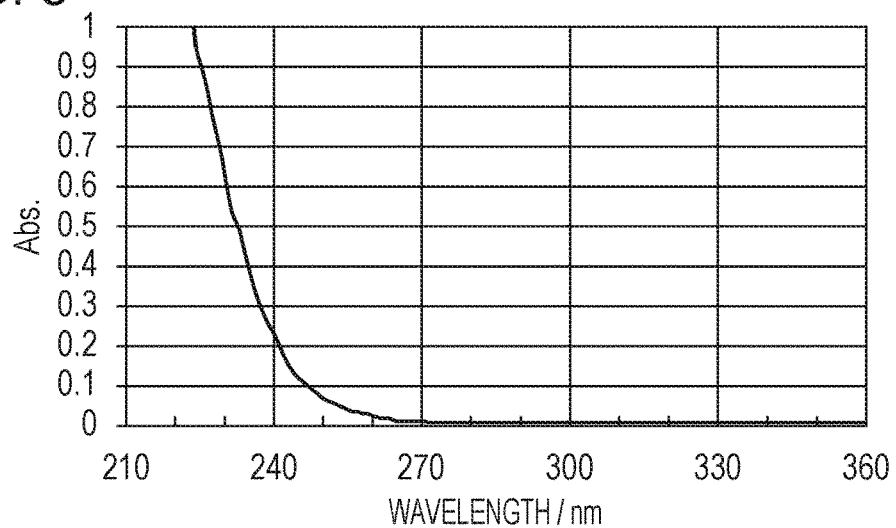
FIG. 3 is a plot of UV absorption wavelength of a water-repellent layer, according to one or more aspect of the current disclosure.

Then, the water-repellent layer 5 is irradiated with UV light 12 including a light ray having a wavelength of less than 270 nm to decompose the second hydrolyzable silane compound in the water-repellent layer 5, as shown in FIG. 2G. An example of the spectral sensitivity of the second hydrolyzable silane compound is shown in FIG. 3. FIG. 3 shows that the second hydrolyzable silane compound exhibits absorption of light by the carbonyl group in the region of wavelengths of less than 270 nm. By irradiation with light in the region of wavelengths of less than 270 nm, a decomposition reaction is caused at the carbonyl group, thereby exposing hydroxy groups at the ejection opening surface. Thus, the surface of the water-repellent layer is charged to a negative potential, consequently, preventing ink from adhering to the surface.

For irradiation with UV light 12, a UV irradiator including, for example, a high-pressure mercury-vapor lamp or a UV LED is used. Deep UV LEDs have been being developed, and those with high illuminance are on the market. An LED having an optimum wavelength can be selected depending on the materials of the water-repellent layer and the ejection opening member. To reduce irradiation time, the UV light may be emitted by using an arrangement of a plurality of LEDs, or UV light condensed with a lens disposed between the LED and the ejection opening surface may be emitted. As an alternative to use of an LED having a single wavelength, a plurality of LEDs having different center wavelengths may be used in combination.

Beneficially, the dose of irradiation with UV light 12 is at least such that the second hydrolyzable silane compound can be fully decomposed at the carbonyl group. More specifically, it is beneficial that the dose at which decomposition occurs at the carbonyl group is determined in advance by irradiating the water-repellent layer with UV light, and then the water-repellent layer is irradiated with UV light 12 at a dose higher than or equal to that irradiation dose. Whether the second hydrolyzable silane compound has been decomposed can be checked by TOF-SIMS.

It is expected that the UV irradiation will not only decompose the second hydrolyzable silane compound but also cause the silanol or epoxy group of the condensate to bind with the underlying ejection opening member 4. The silanol group of the condensate is expected to be bound to the epoxy resin in the ejection opening member 4 by heat or the like generated by the UV irradiation. If the condensate contains an epoxy group, it is expected that the UV irradiation will cause a photo-acid generator to proceed a curing reaction as in the case of the curing reaction of the epoxy resin of the ejection opening member 4. After being irradiated with UV light, the ejection opening member 4 and the water-repellent layer 5 are cured by heating. Before being irradiated and heated, the water-repellent layer 5 may be rinsed with an organic solvent or the like. This rinsing operation can remove the fluorine-containing group separated from the second hydrolyzable silane compound by the UV irradiation.

Then, the liquid ejection head is completed through electrical connection for driving the energy generating elements 2 and mechanical connection of supply members for liquid supply (not shown).

The resulting liquid ejection head is unlikely to allow foreign matter to adhere to the water-repellent layer and maintains high water repellency.

EXAMPLES

The subject matter of the present disclosure will be further described in detail with reference to Examples and Comparative Examples. The Examples and Comparative Examples were evaluated by the following examinations.

Initial Water Repellency Measurement

For evaluating the initial water repellency of the water-repellent layer, the dynamic receding contact angle θr of pure water was measured with a small contact angle meter DropMeasure manufactured by Microjet. When the dynamic receding contact angle of pure water was 90° or more, the initial water repellency was rated as A; when it was less than 90°, the initial water repellency was rated as B.

Pigment Ink Adhesion Test

For evaluating the adhesion of pigment ink to the water-repellent layer, each sample was immersed in a pigment ink at 60° C. for a week. After being rinsed with water, the surface of the water-repellent layer was observed under a metal microscope for checking for pigment components attached to the surface, and the dynamic receding contact angle θr of water on the surface was measured. When there was observed no pigment component attached to the surface while the dynamic receding contact angle of pure water was 80° or more, the test result was rated as A; when there was observed some pigment component attached to the surface while the dynamic receding contact angle of pure water was less than 80°, the test result was rated as B.

Water-Repellent Durability Test

For evaluating the durability of the water repellency of the water-repellent layer, each sample was immersed in a pH 10 alkaline aqueous solution at 60° C. for a week. After being rinsed with water, the dynamic receding contact angle θr of water on the surface of the water-repellent layer was measured. When the dynamic receding contact angle of pure water was 80° or more after the immersion test, the water-repellent durability was rated as A; when it was less than 80°, the water-repellent durability was rated as B.

Printing Test

A solid pattern was printed over the entire surface of a printing sheet HR-101s (ink jet printing paper manufactured by Canon) by one pass printing with each of the liquid ejection heads having the ejection opening surfaces of the following Examples and Comparative Examples with a distance of 1.9 mm between the head and the printing sheet. The resulting printed sheet was visually observed. When a sample in which a white streak was observed, the sample was rated as B. When there was observed no white streak, the sample was rated as A.

Example 1

First, a condensate of hydrolyzable silane compounds was prepared according to the following procedure. A flask equipped with a cooling tube was charged with 14.2 g of the first hydrolyzable silane compound represented by the following formula (25), 13.18 g of the second hydrolyzable silane compound represented by the following formula (26), 2.59 g of water, 16.42 g of ethanol, and 52.71 g of hydrofluoroether HFE 7200 produced by 3M, and the materials were stirred in the flask at room temperature for 5 minutes. The mixture was then heated to reflux for 24 hours to yield a condensate.

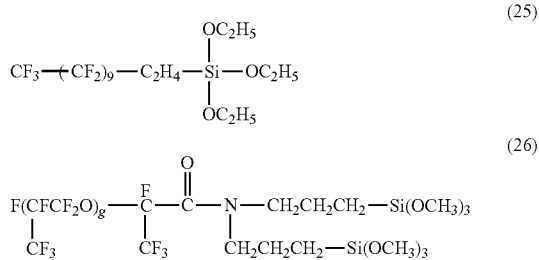

wherein g in formula (26) represents an integer of 3 to 10.

Subsequently, ethanol was added so that the condensate content in the water-repellent material would be 7% by mass.

Then, the water-repellent material was applied onto the surface of an ejection opening member made of a polyimide film by using a slit coater, and the coating was heated at 90° C. to yield a water-repellent layer. The thickness of the water-repellent layer after heating was 0.5 μm.

Figure 4:
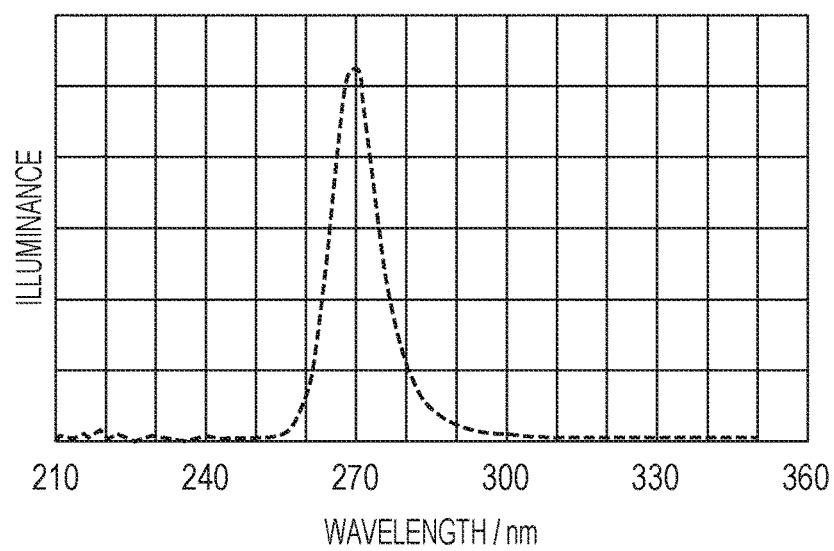
FIG. 4 is a plot of illuminance distribution of a deep UV LED, according to one or more aspect of the current disclosure.

Subsequently, the surface of the water-repellent layer was irradiated with UV light including a light ray having a wavelength of less than 270 nm from a UV LED having a center wavelength of 280 nm and an illuminance distribution shown in FIG. 4.

Before this operation, how much the irradiation dose would be required for the decomposition at the carbonyl group was determined by analysis of UV irradiation of the compound represented by formula (26).

Whether a decomposition had occurred at the carbonyl group was checked by TOF-SIMS analysis. Whether the decomposition at the carbonyl group had occurred was determined according to the presence or absence of the fluorine-containing group derived from the second hydrolyzable silane compound. Whether the water-repellent component remained was examined by using the counts of CF, $CF_3$, and $C_2F_4$ of the TOF-SIMS results.

Then, the sample was rinsed with methyl isobutyl ketone and heated at 200° C. for 1 hour to yield a cured water-repellent layer.

Example 2

A condensate was prepared in the same manner as in Example 1, except that the compound represented by the following formula (27) and the compound represented by the following formula (28) were used as the first hydrolyzable silane compound and the second hydrolyzable silane compound, respectively.

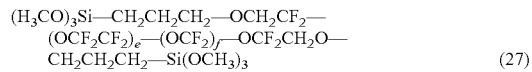

wherein e and f in formula (27) each represent an integer of 1 to 30.

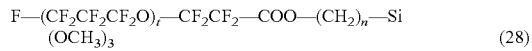

wherein t in formula (28) represents an integer of 1 to 30.

Then, a coating of the water-repellent material prepared in the same manner as in Example 1 was cured to yield a water-repellent payer.

Examples 3, 4, 5, and 6

The materials shown in the following Table 1 were stirred in a flask equipped with a cooling tube at room temperature for 5 minutes, and the mixture was then heated to reflux for 24 hours to yield a condensate. Subsequently, ethanol was added so that the condensate content in the water-repellent material would be 7% by mass.

In Example 6, the compound represented by the following formula (29) was used as the first hydrolyzable silane compounds:

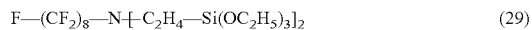

Next, 100 parts by mass of a photopolymerizable resin 157S70 produced by Mitsubishi Chemical and 6 parts by mass of a photo-acid generator CPI-410S produced by San-Apro were dissolved in 80 parts by mass of a solvent propylene glycol monoethyl ether acetate. The solution was applied to a thickness of 10 μm onto a substrate by spin coating, and the coating was heated at 90° C. for 5 minutes to yield a resin layer. The surface of the resin layer was intended as the ejection opening surface.

Subsequently, a water-repellent material was applied onto the surface of the resin layer by using a slit coater, and the coating was heated at 90° C. to yield a water-repellent layer at the surface of the resin layer. The thickness of the water-repellent layer after heating was 0.5 μm.

The resin layer and the water-repellent layer were irradiated with i-line light and heated at 90° C. for 4 minutes. Subsequently, these layers were subjected to development with a mixture of methyl isobutyl ketone and xylene, rinsed with isopropanol, and then further heated at 140° C. for 4 minutes.

Figure 5:
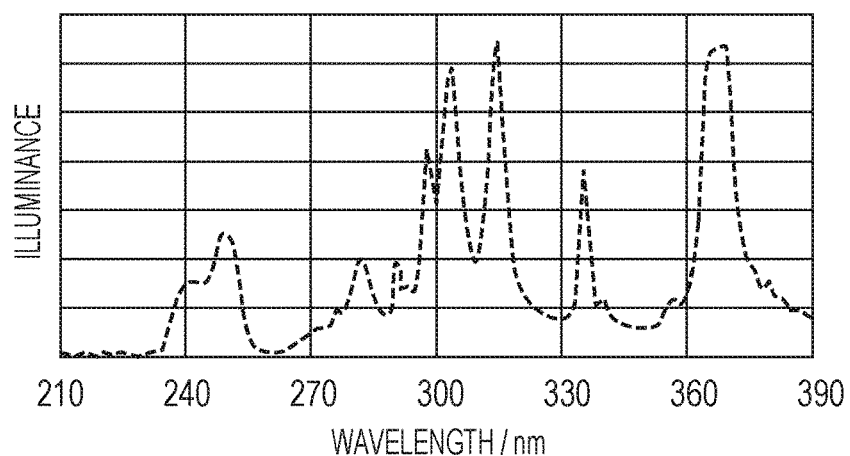
FIG. 5 is a plot of illuminance distribution of an exposure device, according to one or more aspect of the current disclosure.

Then, the surface of the water-repellent layer was irradiated with UV light. For this irradiation was used an exposure apparatus MA-200 (manufactured by SUSS MicroTec) having the illuminance distribution shown in FIG. 5.

Before this operation, how much the irradiation dose would be required for the decomposition at the carbonyl group was determined by analysis of UV irradiation of the compound represented by formula (26).

Then, the sample was rinsed with methyl isobutyl ketone and heated at 200° C. for 1 hour to yield a cured water-repellent layer.

Comparative Examples 1 and 2

The materials shown in the following Table 1 were stirred in a flask equipped with a cooling tube at room temperature for 5 minutes, and the mixture was then heated to reflux for 24 hours to yield a condensate. Subsequently, ethanol was added so that the condensate content in the water-repellent material would be 7% by mass.

Other steps were conducted in the same manner as in Example 3, and, thus, a cured water-repellent layer was obtained.

Comparative Examples 3 and 4

The condensate used in Example 1 was prepared for Comparative Example 3, and the condensate used in Comparative Example 2 was prepared for Comparative Example 4. Then, a cured water-repellent layer was formed in the same manner as in Example 3, except that the surface of the water-repellent layer was not irradiated with light including a light ray having a wavelength of less than 270 nm.

Comparative Example 5

In Comparative Example 5, the condensate used in Example 1 was used. This condensate was irradiated with UV light including a light ray having a wavelength of less than 270 nm in advance for decomposition at the carbonyl group of the second hydrolyzable silane compound. Then, a cured water-repellent layer was formed in the same manner as in Example 3, except that the surface of the water-repellent layer was not irradiated with light including a light ray having a wavelength of less than 270 nm.

TABLE 1

|  | Example 3 | Example 4 | Example 5 | Example 6 | Comparative Example 1 | Comparative Example 2 |
|---|---|---|---|---|---|---|
| Equation (25) | 1.6 g | 1.6 g | 1.6 g | — | 35.5 g | — |
| Equation (26) | 1.1 g | 1.1 g | 1.1 g | 1.1 g | — | 39.5 g |
| GPTES | 27.0 g | 13.5 g | 13.5 g | 27.0 g | — | — |
| MTEOS | — | 8.7 g | — | — | — | — |
| Cl | — | — | 10.6 g | — | — | — |
| Equation (29) | — | — | — | 1.7 g | — | — |
| Water | 6.5 g | 6.5 g | 6.5 g | 6.5 g | 3.2 g | 3.9 g |
| Ethanol | 27.2 g | 14.7 g | 27.0 g | 27.2 g | 103.7 g | 40.0 g |
| HFE 7200 | 4.2 g | 4.2 g | 4.2 g | 4.2 g | — | 43.0 g |

GPTES: γ-Glycidoxypropyltriethoxysilane
MTEOS: Methyltriethoxysilane
Cl: Trifluoropropyltrimethoxysilane Results The examination results are shown in Table 2 together.

TABLE 2

|  | 1st hydrolyzable silane compound | 2nd hydrolyzable silane compound | Additional hydrolyzable silane compound | Underlying layer | UV irradiation | Initial water repellency | Pigment ink adhesion | Water-repellent durability | Printing test |
|---|---|---|---|---|---|---|---|---|---|
| Example 1 | Equation (25) | Equation (26) | — | Polyimide film | Done | A | A | A | A |
| Example 2 | Equation (27) | Equation (28) | — | Polyimide film | Done | A | A | A | A |
| Example 3 | Equation (25) | Equation (26) | GPTES | Photopolymerizable resin | Done | A | A | A | A |
| Example 4 | Equation (25) | Equation (26) | GPTES + MTEOS | Photopolymerizable resin | Done | A | A | A | A |
| Example 5 | Equation (25) | Equation (26) | GPTES + Cl | Photopolymerizable resin | Done | A | A | A | A |
| Example 6 | Equation (29) | Equation (26) | GPTES | Photopolymerizable resin | Done | A | A | A | A |
| Comparative Example 1 | Equation (25) | — | — | Photopolymerizable resin | Done | A | B | B | B |
| Comparative Example 2 | — | Equation (26) | — | Photopolymerizable resin | Done | B | B | B | B |
| Comparative Example 3 | Equation (25) | Equation (26) | — | Photopolymerizable resin | Not done | A | B | A | B |
| Comparative Example 4 | — | Equation (26) | — | Photopolymerizable resin | Not done | A | B | A | B |
| Comparative Example 5 | Equation (25) | Equation (26) | GPTES | Photopolymerizable resin | Done* | A | B | A | B |

*Water-repellent layer was irradiated.

As shown in Table 2, the ejection opening surfaces of the liquid ejection heads of Examples 1 to 6, which are according to the present disclosure, exhibited good initial water repellency, high resistance to adhesion of pigment ink, high water-repellent durability, and no adverse effect on printing by the liquid ejection head.

In Comparative Example 1, on the other hand, although the dynamic receding contact angle of pure water, measured in the pigment ink adhesion test, was 80° or more, there was observed an adhesion of the pigment ink when checked under a metal microscope. In addition, a white streak occurred in the printing test. Since the second hydrolyzable silane compound is not used in Comparative Example 1, hydroxy groups were not formed even by irradiating the water-repellent layer with light including a light ray having a wavelength of less than 270 nm. This can be a reason for the occurrence of adhesion of the pigment ink.

In Comparative Example 2, all the results were rated as B. The result of ultimate analysis of the cured water-repellent layer showed that fluorine components had disappeared. It is assumed that the disappearance of fluorine components is a decomposition of the compound represented by formula (26) caused by irradiating the water-repellent layer with light including a light ray having a wavelength of less than 270 nm.

In Comparative Examples 3 and 4, although the dynamic receding contact angle of pure water, measured in the pigment ink adhesion test, was 80° or more, there was observed an adhesion of the pigment ink. This is probably because the water-repellent layer was not irradiated with light including a light ray having a wavelength of less than 270 nm. The second hydrolyzable silane compound was therefore not decomposed at the carbonyl group, and accordingly hydroxy groups were not exposed at the surface of the water-repellent layer.

In Comparative Example 5 as well, although the dynamic receding contact angle of pure water, measured in the pigment ink adhesion test, was 80° or more, there was observed an adhesion of the pigment ink. This is probably because the fluorine-containing group was removed by irradiating the water-repellent material in advance with light including a light ray having a wavelength of less than 270 nm to decompose the second hydrolyzable silane compound at the carbonyl group. Although fluorine-containing groups would be segregated to the surface of the water-repellent layer when the water-repellent material was applied, hydroxy groups were not segregated. The hydroxy groups were therefore not exposed at the ejection opening surface.

It has been thus confirmed that the liquid ejection head manufactured by the method according to the present disclosure prevents ink from adhering to the ejection opening surface.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-233343 filed Nov. 30, 2016, which is hereby incorporated by reference herein in its entirety.

What is claimed is:

1. A method for manufacturing a liquid ejection head having a water-repellent layer at an ejection opening surface having an ejection opening therein through which a liquid is ejected, the method comprising:

forming a water-repellent layer containing a condensate of a first hydrolyzable silane compound and a second hydrolyzable silane compound, the first hydrolyzable silane compound containing a fluorine-containing group but no carbonyl group between the fluorine-containing group and a silicon atom, the second hydrolyzable silane compound containing a fluorine-containing group and a carbonyl group between the fluorine-containing group and a silicon atom; and irradiating the water-repellent layer with light including a light ray having a wavelength of less than 270 nm, wherein the fluorine-containing group of the second hydrolyzable silane compound is removed by the irradiation of the water-repellent layer.

2. The method according to claim 1, wherein the first hydrolyzable silane compound is at least one selected from the compounds represented by the following formulas (1) to (4):

wherein, in the formulas (1) to (4), $R_f$ represents a chemical group containing at least one selected from the group consisting of perfluoroalkylene groups, perfluoropolyether groups, and perfluorophenylene groups, D represents a single bond or an organic group having a carbon number of 1 to 12, A represents an organic group having a carbon number of 1 to 12, X represents a hydrolyzable substituent, Y and R each represent a non-hydrolyzable substituent, a represents an integer of 1 to 3, and E represents a divalent or trivalent linking group having no carbonyl group, and n represents 1 when E represents a divalent linking group, or 2 when E represents a trivalent linking group, and wherein $R_f$, D, A, X, Y, R, E, n, and a each may be the same or different among the formulas (1) to (4).

3. The method according to claim 2, wherein $R_f$ in the formulas (1) to (4) represents a perfluoroalkylene group or a perfluoropolyether group.

4. The method according to claim 2, wherein $R_f$ in the formulas (1) to (4) is a group represented by the following formula (8):

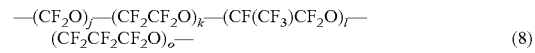

wherein j, k, l, and o each represent an integer of 0 or more, and at least one of j, k, l, and o is 2 or more.

5. The method according to claim 1, wherein the second hydrolyzable silane compound is at least one selected from the compounds represented by the following formulas (5) to (7):

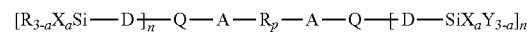

-continued

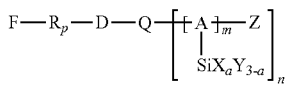
(7)

wherein, in the formulas (5) to (7), $R_p$ represents a chemical group containing at least one selected from the group consisting of perfluoroalkylene groups, perfluoropolyether groups, and perfluorophenylene groups, D represents a single bond or an organic group having a carbon number of 1 to 12, A represents an organic group having a carbon number of 1 to 12, X represents a hydrolyzable substituent, Y and R each represent a non-hydrolyzable substituent, Z represents a hydrogen atom or an alkyl group, Q represents a divalent or trivalent linking group containing a carbonyl group, n represents 1 when Q represents a divalent linking group, or 2 when Q represents a trivalent linking group, a represents an integer of 1 to 3, and m represents an integer of 1 to 4, and wherein $R_p$, D, A, X, Y, R, Z, Q, n, and a each may be the same or different among the formulas (5) to (7).

6. The method according to claim 5, wherein Q in the formulas (5) to (7) represents a chemical group selected from the group consisting of a carbonyl group represented by —CO—, an ester group represented by —COO—, and amide groups represented by —CONH— and —CON<.

7. The method according to claim 5, wherein $R_p$ in the formulas (5) to (7) represents a perfluoroalkylene group or a perfluoropolyether group.

8. The method according to claim 5, wherein $R_p$ in the formulas (5) to (7) is a group represented by the following formula (8):

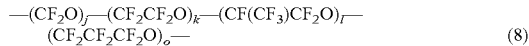
(8)

wherein j, k, l, and o each represent an integer of 0 or more, and at least one of j, k, l, and o is 2 or more.

9. The method according to claim 1, wherein the amount by mole of the first hydrolyzable silane compound is 1 time to 10 times the amount by mole of the second hydrolyzable silane compound in a reaction to form the condensate.

10. The method according to claim 1, wherein the condensate is a condensate of the first hydrolyzable silane compound, the second hydrolyzable silane compound, and a hydrolyzable silane compound containing an epoxy group.

11. The method according to claim 1, further comprising rinsing the water-repellent layer with a liquid after the irradiation.

12. The method according to claim 1, further comprising heating the water-repellent layer before the irradiation.

13. The method according to claim 1, further comprising forming a liquid supply port in a substrate after the irradiation of the water-repellent layer, the liquid supply port allowing the liquid to be supplied to the ejection opening therethrough.

14. The method according to claim 1, wherein the water-repellent layer and pure water have a dynamic receding contact angle of 80° or more.

15. The method according to claim 1, wherein the liquid is a pigment ink.

16. A method for manufacturing a liquid ejection head having a water-repellent layer at an ejection opening surface having an ejection opening therein through which a liquid is ejected, the method comprising:

forming a water-repellent layer containing a condensate of a first hydrolyzable silane compound and a second hydrolyzable silane compound, the first hydrolyzable silane compound containing a fluorine-containing group but no carbonyl group between the fluorine-containing group and a silicon atom, the second hydrolyzable silane compound containing a fluorine-containing group and a carbonyl group between the fluorine-containing group and a silicon atom;

irradiating the water-repellent layer with light including a light ray having a wavelength of less than 270 nm; and exposing the water-repellent layer to light to form a latent image of the ejection opening between the formation of the water-repellent layer and the irradiation.

17. The method according to claim 16, wherein the first hydrolyzable silane compound is at least one selected from the compounds represented by the following formulas (1) to (4):

(1)

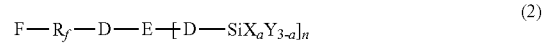
(2)

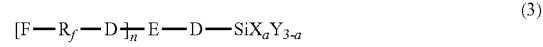
(3)

(4)

wherein, in the formulas (1) to (4), $R_f$ represents a chemical group containing at least one selected from the group consisting of perfluoroalkylene groups, perfluoropolyether groups, and perfluorophenylene groups, D represents a single bond or an organic group having a carbon number of 1 to 12, A represents an organic group having a carbon number of 1 to 12, X represents a hydrolyzable substituent, Y and R each represent a non-hydrolyzable substituent, a represents an integer of 1 to 3, and E represents a divalent or trivalent linking group having no carbonyl group, and n represents 1 when E represents a divalent linking group, or 2 when E represents a trivalent linking group, and wherein $R_f$, D, A, X, Y, R, E, n, and a each may be the same or different among the formulas (1) to (4).

18. The method according to claim 16, wherein the second hydrolyzable silane compound is at least one selected from the compounds represented by the following formulas (5) to (7):

(5)

(6)

(7)

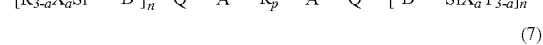

wherein, in the formulas (5) to (7), $R_p$ represents a chemical group containing at least one selected from the group consisting of perfluoroalkylene groups, perfluoropolyether groups, and perfluorophenylene groups, D represents a single bond or an organic group having a carbon number of 1 to 12, A represents an organic group having a carbon number of 1 to 12, X represents a hydrolyzable substituent, Y and R each represent a non-hydrolyzable substituent, Z represents a hydrogen atom or an alkyl group, Q represents a divalent or trivalent linking group containing a carbonyl group, n represents 1 when Q represents a divalent linking group, or 2 when Q represents a trivalent linking group, a represents an integer of 1 to 3, and m represents an integer of 1 to 4, and wherein $R_p$, D, A, X, Y, R, Z, Q, n, and a each may be the same or different among the formulas (5) to (7).

19. The method according to claim 16, wherein the amount by mole of the first hydrolyzable silane compound is 1 time to 10 times the amount by mole of the second hydrolyzable silane compound in a reaction to form the condensate.

20. The method according to claim 16, wherein the condensate is a condensate of the first hydrolyzable silane compound, the second hydrolyzable silane compound, and a hydrolyzable silane compound containing an epoxy group.

* * * * *